United States Patent
Maier et al.

(10) Patent No.: US 12,452,439 B2
(45) Date of Patent: Oct. 21, 2025

(54) METHOD AND SYSTEM FOR GENERATING A COMPRESSED DATA STREAM

(71) Applicant: TriLite Technologies GmbH, Vienna (AT)

(72) Inventors: Franz Josef Maier, Poertschach am Woerthersee (AT); Ben-Daniel Keller, Perchtoldsdorf (AT); Johannes Wolkerstorfer, Graz (AT); Christopher Dissauer-Eberl, Graz (AT)

(73) Assignee: TriLite Technologies GmbH, Vienna (AT)

( * ) Notice: Subject to any disclaimer, the term of this patent is extended or adjusted under 35 U.S.C. 154(b) by 0 days.

(21) Appl. No.: 18/749,745

(22) Filed: Jun. 21, 2024

(65) Prior Publication Data

US 2024/0430456 A1    Dec. 26, 2024

(30) Foreign Application Priority Data

Jun. 22, 2023    (EP) .................................... 23180877

(51) Int. Cl.
*H04N 19/186* (2014.01)
*G06V 10/56* (2022.01)

(52) U.S. Cl.
CPC ........... *H04N 19/186* (2014.11); *G06V 10/56* (2022.01)

(58) Field of Classification Search
CPC .... G06V 10/56; H04N 19/186; H04N 9/3135; H04N 9/3179; H04N 9/3185
See application file for complete search history.

(56) References Cited

U.S. PATENT DOCUMENTS

| | | | |
|---|---|---|---|
| 5,715,021 A | 2/1998 | Gibeau et al. | |
| 5,774,174 A * | 6/1998 | Hardie | H04N 9/3129 348/E9.026 |
| 6,373,495 B1 | 4/2002 | Lin et al. | |

(Continued)

FOREIGN PATENT DOCUMENTS

| | | |
|---|---|---|
| CN | 109752839 A | 5/2019 |
| GB | 2457155 A | 8/2009 |

(Continued)

OTHER PUBLICATIONS

"An Efficient Compression Scheme for Colour Filter Array Video Sequences"—Doutre et al., 0-7803-9752-5/06/$20.00 ® 2006 IEEE (Year: 2006).*

(Continued)

*Primary Examiner* — Mainul Hasan
(74) *Attorney, Agent, or Firm* — Weaver IP L.L.C.

(57) ABSTRACT

A method of generating a compressed data stream from an uncompressed data stream with red, green and blue sub-streams of red, green and blue colour values of an image, comprising, for each of a number of sub-interval which together form a time interval: Determining, in each sub-stream, at least N−1 sets of successive equal colour values and run-lengths indicating the numbers of colour values in the sets; and generating a data packet composed of one colour value from each set and their respective run-lengths; which data packet forms the compressed data stream for said time interval. Further disclosed is a projection system using this method.

17 Claims, 8 Drawing Sheets

(56) References Cited

U.S. PATENT DOCUMENTS

Figure 1:
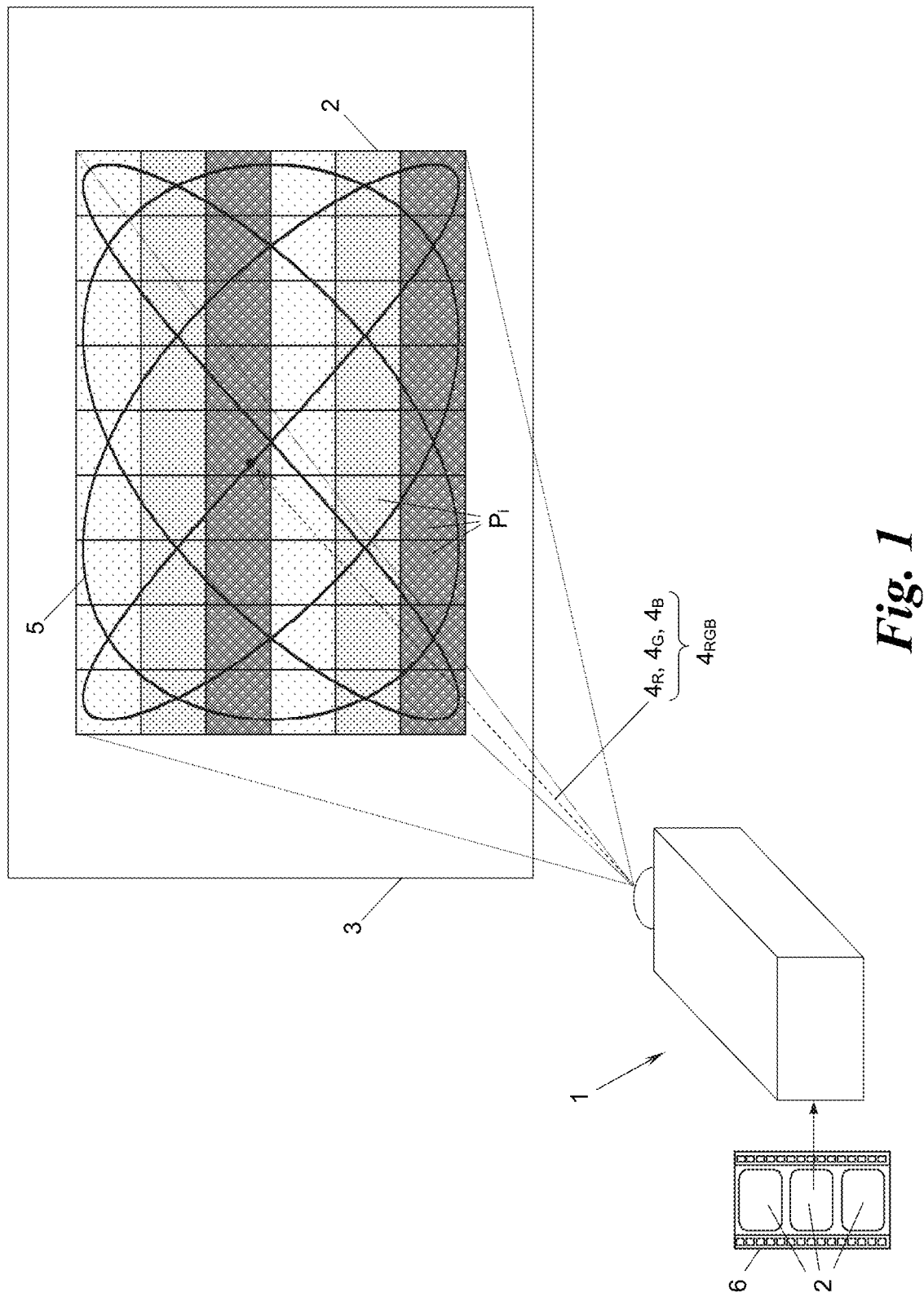

| | | | |
|---|---|---|---|
| 7,289,169 B2 | 10/2007 | Suk | |
| 8,783,874 B1 | 7/2014 | Riza | |
| 10,288,990 B1 | 5/2019 | Ratti et al. | |
| 2009/0051828 A1* | 2/2009 | Brown | G09G 3/02 348/E3.04 |
| 2010/0208148 A1* | 8/2010 | Deppe | H04N 9/3129 348/744 |
| 2012/0127184 A1 | 5/2012 | Satoh et al. | |
| 2012/0275697 A1 | 11/2012 | McDowell et al. | |
| 2014/0126590 A1 | 5/2014 | Kimura | |
| 2016/0044290 A1* | 2/2016 | Morimoto | H04N 9/3164 348/750 |
| 2018/0227540 A1* | 8/2018 | Stolitzka | G06F 3/14 |
| 2018/0308458 A1* | 10/2018 | Hall | H04N 19/98 |
| 2021/0210031 A1* | 7/2021 | Kang | G09G 3/3413 |
| 2022/0326594 A1 | 10/2022 | Smits | |
| 2023/0370574 A1 | 11/2023 | Blicharski et al. | |
| 2024/0428712 A1 | 12/2024 | Maier et al. | |
| 2024/0428713 A1 | 12/2024 | Maier et al. | |
| 2024/0430390 A1 | 12/2024 | Maier et al. | |

FOREIGN PATENT DOCUMENTS

| | | |
|---|---|---|
| WO | 2019/143525 A1 | 7/2019 |
| WO | 2022/100847 A1 | 5/2022 |

OTHER PUBLICATIONS

Extended European Search Report received for European Patent Application No. 23180876.7, mailed on Dec. 11, 2023, 14 pages.

Extended European Search Report received for European Patent Application No. 23196195.4, mailed on Mar. 11, 2024, 8 pages.

Extended European Search Report received for European Patent Application No. 23214645.6, mailed on May 22, 2024, 11 pages.

Extended European Search Report received for European Patent Application No. 23180877.5, mailed on Dec. 7, 2023, 9 pages.

* cited by examiner

METHOD AND SYSTEM FOR GENERATING A COMPRESSED DATA STREAM

CROSS-REFERENCE TO RELATED APPLICATIONS

This application claims priority to European Patent Application No. 23 180 877.5 filed Jun. 22, 2023 the disclosure of which is incorporated herein by reference.

TECHNICAL FIELD

The present disclosed subject matter relates to a method of generating a compressed data stream from an image comprised of pixels which each have a red, a green and a blue colour value, wherein the data stream is to be fed into a projector scanning a red, a green and a blue light beam across an image area according to a given scan pattern, the light beams being modulated in intensity according to respective red, green and blue colour values in the compressed data stream. The present disclosed subject matter further relates to a projection system employing said method.

BACKGROUND

Projectors which scan red, green and blue (RGB) light beams across an image area are commonly used in virtual reality (VR) or augmented reality (AR) glasses, helmets or head-up displays (HUDs) for a broad range of applications like navigation, training, entertainment, education or work. Driven by a light source driver, a light source emits the RGB light beam onto a scanner, while the light source driver modulates the RGB light beam in intensity according to red, green and blue colour values of the pixels of an image. The scanner, e.g., a mirror assembly having one or more moving micro-electro-mechanical-system (MEMS) mirrors, deflects the light beams into subsequent directions (angles) according to a scan pattern towards the image area, e.g., a wall, a board, a projection screen, a poster, the retina of an eye, an augmented reality (AR) combiner waveguide, another combiner optics, or the like, one or more directions (angles) per pixel of the image to display the same on the image area. In raster scanning the scanner scans the light beams across the image area row by row and line by line according to a raster scan pattern. In so-called Lissajous scanning the scanner scans the light beam across the image area according to a "dense" Lissajous pattern which allows for higher speeds of the light beams along the Lissajous pattern and hence higher frame rates, e.g., by exploiting resonances of the MEMS mirror.

To provide the colour values to the light source driver for displaying, a variety of schemes is known. In one exemplary scheme a central processing unit (CPU) converts the image to an RGB stream, e.g., according to the HDMI or DSI standard, and continuously feeds the same to the light source driver for displaying. However, in this scheme, the synchronisation of the feeding of the RGB stream by the CPU with the movement of the scanner, i.e. the provision of the "correct" RGB colour values for the current scanner position, suffers from jitter between the feeding and the scanner movement. For example, when the workload of the CPU is high, the feeding of the RGB stream may be delayed by an interrupt and hence be too slow, such that wrong colour values are displayed at the current scanner position. Similarly, when the movement of the scanner jitters, the feeding may be too fast when the scanner moves slower than expected or too slow when the scanner moves faster than expected, both resulting in wrong colour values being displayed.

To mitigate these jitter problems, in another exemplary scheme a frame buffer is interposed between the CPU and the light source driver, buffers the image and feeds colour values of the image to the light source driver. To synchronise the colour value feeding with the scanner movement, the scanner periodically provides a synchronisation signal indicating the current scanner position within the scan pattern to the frame buffer. The frame buffer identifies the currently needed colour values in the image frame for the indicated scanner position, retrieves those colour values from the frame buffer and feeds the same to the light source driver. While this setup ensures that each colour value provided to the light source driver matches the current scanner position, the frame buffer requires a high processing power for identifying the currently needed colour values and accessing the memory locations in the buffer which may be scattered, e.g., according to the Lissajous pattern. As a result, the pixel feeding rate is limited by the buffer's processing power. Displaying image frames at a high resolution and/or a high frame rate requires a very fast and costly buffer.

BRIEF SUMMARY

It is an object of the present disclosed subject matter to provide a method and a projection system which allow for displaying an image jitter-free and with a high resolution and/or at a high frame rate.

In a first aspect of the disclosed subject matter this object is achieved with a method of generating a compressed data stream from an image comprised of pixels which each have a red, a green and a blue colour value, wherein the compressed data stream is to be fed into a projector scanning a red, a green and a blue light beam across an image area according to a given scan pattern, the light beams being modulated in intensity according to respective red, green and blue colour values in the compressed data stream, comprising, for each sub-interval of a fixed number of sub-intervals which together form a time interval:
extracting, from the image, i) that red colour value that is to be displayed by the red light beam within said sub-interval according to the scan pattern, ii) that green colour value that is to be displayed by the green light beam within said sub-interval according to the scan pattern, and iii) that blue colour value that is to be displayed by the blue light beam within said sub-interval according to the scan pattern, and
appending the extracted red, green and blue colour values to an uncompressed data stream which has a red sub-stream for the extracted red colour values, a green sub-stream for the extracted green colour values and a blue sub-stream for the extracted blue colour values, wherein the red, green and blue sub-streams within said time interval form one segment of the uncompressed data stream;

determining, i) in the red sub-stream of said segment, N red sets each of one or more successive equal red colour values and for each red set a run-length indicating the number of red colour values in this red set, ii) in the green sub-stream of said segment, N green sets each of one or more successive equal green colour values and for each green set a run-length indicating the number of green colour values in this green set, and iii) in the blue sub-stream of said segment, N blue sets each of one or more successive equal blue colour values and for each blue set a run-length indicating the number of blue colour values in this blue set, wherein at least one of said sets comprises at least two successive equal colour values;

generating, for said segment, a data packet composed of one red colour value from each of at least N−1 red sets, one green colour value from each of at least N−1 green sets, one blue colour value from each of at least N−1 blue sets, the run-lengths of at least N−1 red sets, the run-lengths of at least N−1 green sets, and the run-lengths of at least N−1 blue sets, which data packet forms the compressed data stream for said time interval.

The present method is based on the provision of an uncompressed data stream of colour values which is already in the correct play-out order and the packetizing of this uncompressed data stream into a compressed data stream of data packets each encoded by means of the disclosed run-length encoding scheme. To provide the colour values in the correct play-out order, i.e. as they are to be played-out according to the scan pattern, the colour values are successively extracted from the image following the scan pattern over sub-intervals successive time intervals; and appended to the uncompressed data stream. For packetized compression that data stream is segmented, each segment containing the colour values for the respective time interval. Each segment is then run-length encoded by determining N sets of successive colour values and their respective run-lengths and by generating a data packet representing those N sets. Since at least one of the sets has at least two successive equal colour values, a compression is achieved: Instead of a multitude of successive colour values a single colour value and its respective run-length are included in the data packet. Each data packet thus includes the colour values to be displayed for a time interval in a compressed form.

The present method achieves a number of advantages. Compared to feeding a continuous RGB stream to the projector, feeding the smaller data packets of a compressed data stream requires less time, e.g., only half of each time interval. Thus, a CPU feeding the compressed data stream to a light source driver or a buffer gains spare time within each time interval which can be utilised to balance jitter. For instance, the CPU may generate each data packet during a current time interval for a following time interval and feed the same to the projector at an arbitrary time before the beginning of the next time interval. Consequently, the packet feeding can compensate for any jitter of the scanner movement or any jitter of the CPU's feeding rhythm caused by, e.g., interrupts of the CPU. The CPU is free to perform additional computations, e.g., of dynamic brightness or distortion corrections by altering the colour values of the image on-the-fly.

Furthermore, due to the compression of the uncompressed data stream, the bandwidth per colour value feeding is reduced. The CPU may thus feed more colour values into the projector per time interval, which allows to display the image with a higher resolution and/or at a higher frame rate. In addition smaller data packets require less storage space such that a smaller buffer may be employed.

Since the data packets contain the colour values already in the correct play-out order, an interposed buffer need not be synchronised each time new colour values are to be played-out but, e.g., only when the play-out of a data packet shall be (re-)synchronised to the scanner movement. The synchronisation or trigger signal can be sent less often to the buffer and synchronise all three colour channels at once. As a result, the buffer is eased from processing frequent synchronisation signals and—e.g., in case of a Lissajous pattern—from identifying scattered memory addresses when retrieving the colour values from the buffer. The buffer can feed the colour values to the light source driver at a higher rate, and the projector is capable to display image frames with a higher resolution and/or with a higher frame rate. Moreover, when the data packets include the same number of red, green and blue colour values and the same number of run-lengths, a constant compression ratio may be achieved.

Summing up, the present method generates a packetized compressed data stream which allows for displaying an image jitter-free and with a high resolution and/or at a high frame rate.

In one embodiment the N determined sets may, e.g., be the first N sets of one or more successive colour values for each colour within the segment of the uncompressed data stream. In an optional embodiment, however, i) at least all but one of the N red sets are determined as those sets that have the highest run-lengths among all possible sets of one or more successive equal red colour values in the red sub-stream of the segment, ii) at least all but one of the N green sets are determined as those sets that have the highest run-lengths among all possible sets of one or more successive equal green colour values in the green sub-stream of the segment, and iii) at least all but one of the N blue sets are determined as those sets that have the highest run-lengths among all possible sets of one or more successive equal blue colour values in the blue sub-stream of the segment. In this way, the compressed data packet most accurately encodes the segment of the compressed data stream by those (N−1 or N) red, green and blue sets that have the longest run-lengths in the segment and are thus best suited for the encoding.

To further reduce the size of the data packet, in an optional embodiment i) one of the N red sets is determined as the first set of one or more successive equal red colour values in the red sub-stream of the segment, ii) one of the N green sets is determined as the first set of one or more successive equal green colour values in the green sub-stream of the segment, and iii) one of the N blue sets is determined as the first set of one or more successive equal blue colour values in the blue sub-stream of the segment, and the run-lengths of the first sets are included in the data packet, whereas the colour values of the first sets are not included in the data packet. In this embodiment, the colour values of the first sets are assumed to be the same as the colour values of the last sets of the previous data packet, i.e. the colour value is assumed to be already available for a downstream hardware and need not be provided anymore. This embodiment is based on the finding that for many images long run-lengths occur which span two subsequent data packets. Hence, such images can be encoded in a particularly compact way with very low or no information loss.

As the fixed number of sub-intervals per time interval is known, the run-lengths of the N-th sets need not necessarily be included in the data packet. This is utilised in a further optional embodiment wherein i) only the run-lengths of that N−1 red sets which are to be displayed earliest in the segment are included in the data packet, ii) only the run-lengths of that N−1 green sets which are to be displayed earliest in the segment are included in the data packet, and iii) only the run-lengths of that N−1 blue sets which are to be displayed earliest in the segment are included in the data packet. Thereby, the run-length of the N-th set of each colour is not included in the (thus smaller) data packet since it may simply be determined as the difference between the fixed number of sub-intervals and the sum of the run-lengths of the first N−1 sets of this colour in the segment. Consequently, the bandwidth for the data packet feeding is further reduced.

In an advantageous embodiment, the data packet is generated as a matrix with i) a red line having red colour value sections each containing one of the red colour values included in the data packet and a red run-length section containing the run lengths of the red sets included in the data packet, ii) a green line having green colour value sections each containing one of the green colour values included in the data packet and a green run-length section containing the run lengths of the green sets included in the data packet, and iii) a blue line having blue colour value sections each containing one of the blue colour values included in the data packet and a blue run-length section containing the run lengths of the blue sets included in the data packet, wherein all the run-length sections form one row or column of the matrix. In this embodiment all the run-lengths are located at the same position (row or column) within a matrix, which cases subsequent processing of the data packet and may be carried out by a simpler and faster hardware downstream, e.g., in the above-mentioned intermediate buffer or the light source driver.

The number N of determined sets, the size of the run-length sections and the fixed number of sub-intervals may be chosen in many ways, e.g., in dependence of one another and/or of a colour value statistics of one or more images to be displayed. In an optional embodiment N is four and each run-length section has a size of eight bits, the first two bits indicating the run-length of the respective first set, the next three bits indicating the run-length of the respective second set, and the last three bits indicating the run-length of the respective third set. This choice surprisingly achieves a particularly high compression of the uncompressed data stream at a particularly low loss of information for images of usual statistics.

To achieve a uniform data packet in the form of a matrix, it is beneficial when each of the run-length and colour value sections has the same number of bits, e.g. six, eight, ten, twelve or sixteen bits. Since the run-length and colour value sections have the same size, such data packets appear like a standard pixel stream, e.g., similar to an HDMI or DSI video stream, and may thus be processed by standard image processing hardware.

It is beneficial when said fixed number of sub-intervals is at least six, e.g. at least eight, such that long run-lengths can be accommodated in the segment of the uncompressed data stream and can be efficiently compressed.

The present method may be performed for any type of scan pattern. It is especially suited for Lissajous patterns as it avoids a scattered memory access in the buffer by providing the colour-values already in the correct play-out order.

The colour-value extraction may be based on an on-the-fly calculation of the scan pattern. For a particularly fast extraction the image is optionally stored in a memory, each pixel having a memory address, the scan pattern is stored in the form of a look-up table of memory addresses of the pixels to be successively displayed, and the colour values are extracted from the image by retrieving the pixels from the memory according to the memory addresses read successively from the look-up table and extracting the respective colour values from the retrieved pixels.

Optionally said steps of extracting, appending, determining and generating are repeated for at least one further time interval to generate at least one further data packet, all data packets forming then the compressed data stream.

In a second aspect the present disclosed subject matter provides for a projection system for displaying pixels of an image, comprising a projector with a light source configured to emit a red, a green and a blue light beam, a light source driver configured to modulate the light beams in intensity according to red, green and blue colour values in a compressed data stream, a scanner configured to scan the light beams across an image area according to a given scan pattern; and a central processing unit, CPU, configured to hold the image in a memory, for each sub-interval of a fixed number of sub-intervals which together form a time interval:

extract, from the image, i) that red colour value that is to be displayed by the red light beam within said sub-interval according to the scan pattern, ii) that green colour value that is to be displayed by the green light beam within said sub-interval according to the scan pattern, and iii) that blue colour value that is to be displayed by the blue light beam within said sub-interval according to the scan pattern, and append the extracted red, green and blue colour values to an uncompressed data stream which has a red sub-stream for the extracted red colour values, a green sub-stream for the extracted green colour values and a blue sub-stream for the extracted blue colour values, wherein the red, green and blue sub-streams within said time interval form one segment of the uncompressed data stream;

determine, i) in the red sub-stream of said segment, N red sets each of one or more successive equal red colour values and for each red set a run-length indicating the number of red colour values in this red set, ii) in the green sub-stream of said segment, N green sets each of one or more successive equal green colour values and for each green set a run-length indicating the number of green colour values in this green set, and iii) in the blue sub-stream of said segment, N blue sets each of one or more successive equal blue colour values and for each blue set a run-length indicating the number of blue colour values in this blue set, wherein at least one of said sets comprises at least two successive equal colour values;

generate, for said segment, a data packet composed of one red colour value from each of at least N−1 red sets, one green colour value from each of at least N−1 green sets, one blue colour value from each of at least N−1 blue sets, the run-lengths of at least N−1 red sets, the run-lengths of at least N−1 green sets, and the run-lengths of at least N−1 blue sets, which data packet forms the compressed data stream for said time interval; and feed the compressed data stream towards the projector for displaying.

The projection system utilises the compressed data stream generated by the CPU according to the present method in order to display pixels of an image. To this end the projection system may utilise any of the above-mentioned embodiments to achieve the above-mentioned advantages.

In an optional embodiment, the projection system further comprises a buffer interposed between the CPU and the projector to buffer the data packet and feed the same to the light source driver. In a possible variant of this embodiment the buffer is configured to feed the data packet in synchronism with the scanner to the projector for displaying. Such a synchronism may be achieved, e.g., by sending synchronisation or trigger signals from the scanner to the buffer, in order to couple the transmission of the data packet to the scanner movement.

BRIEF DESCRIPTION OF THE DRAWINGS/FIGURES

Figure 2:
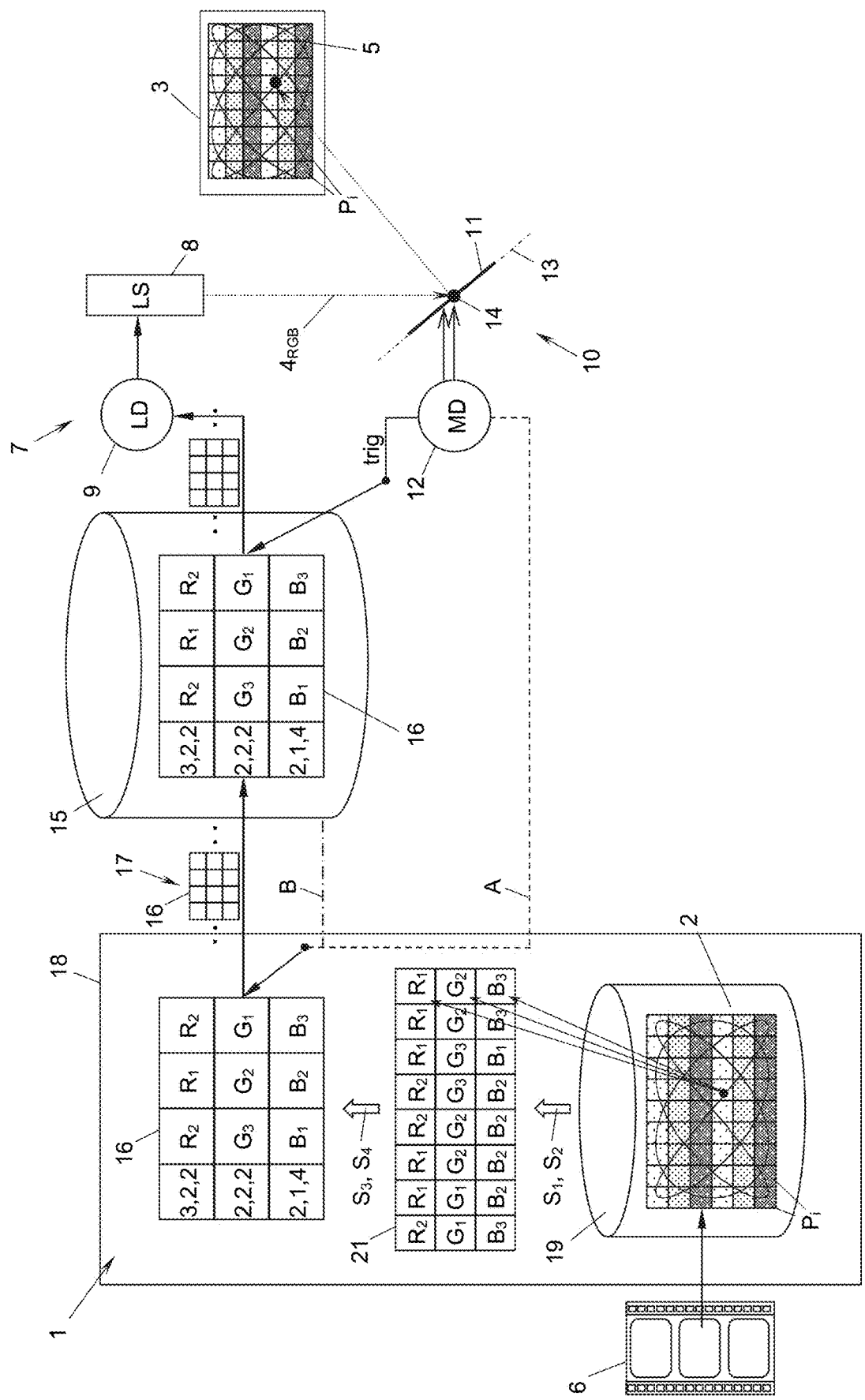
Figure 3:
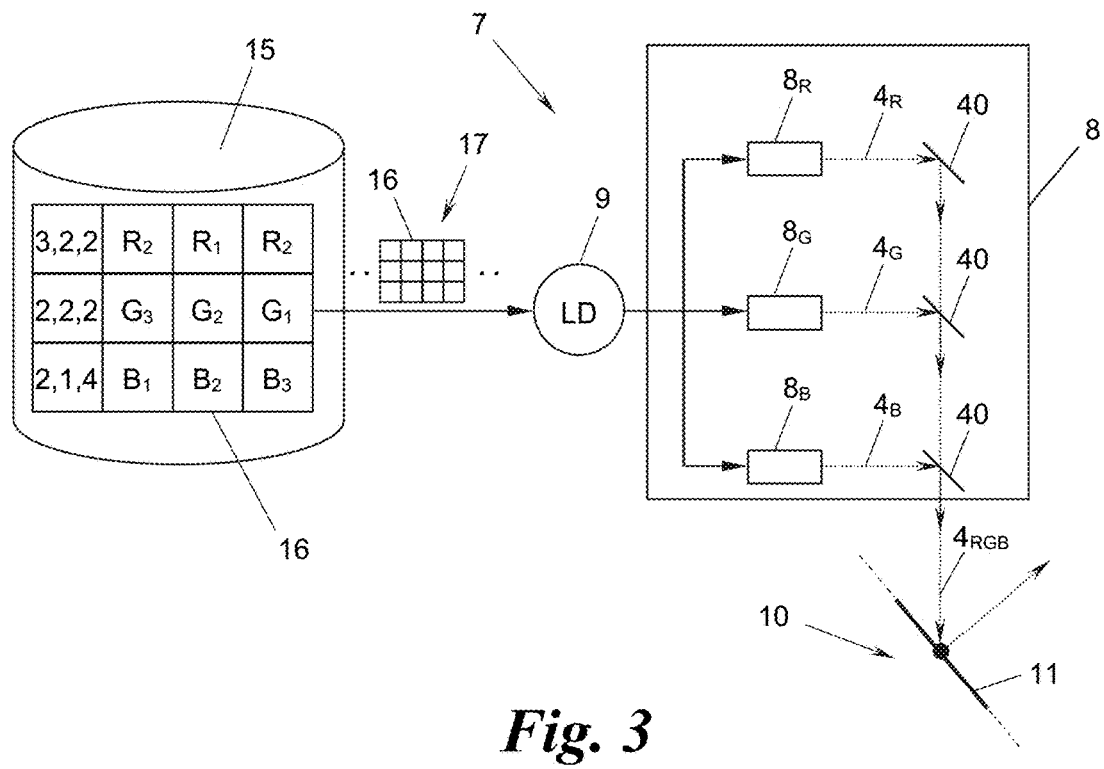
Figure 4:
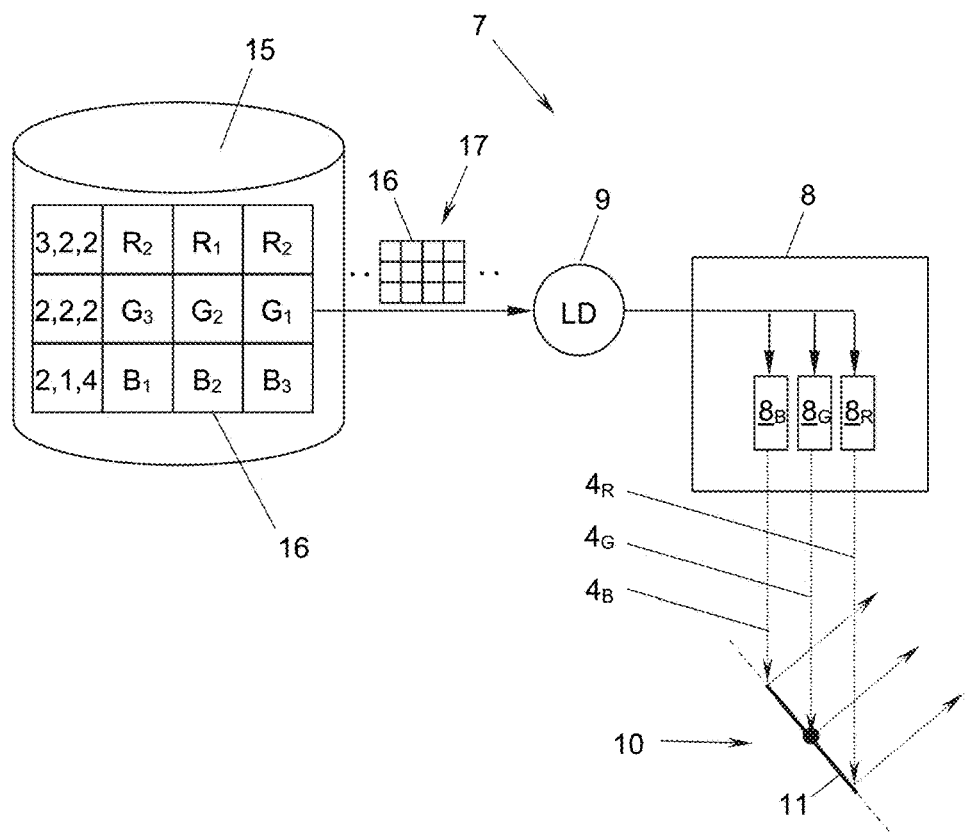
Figure 5:
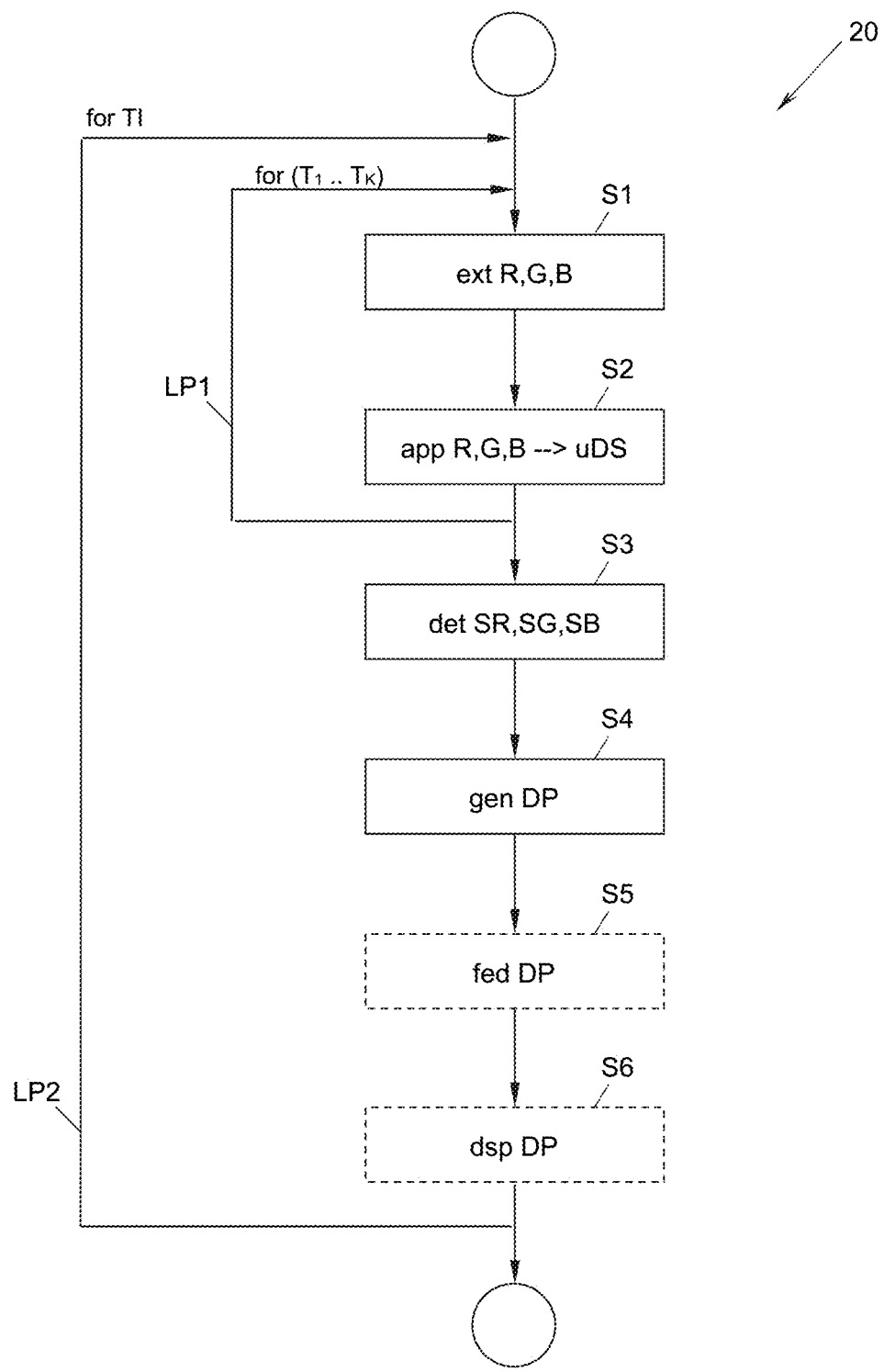
Figure 6:
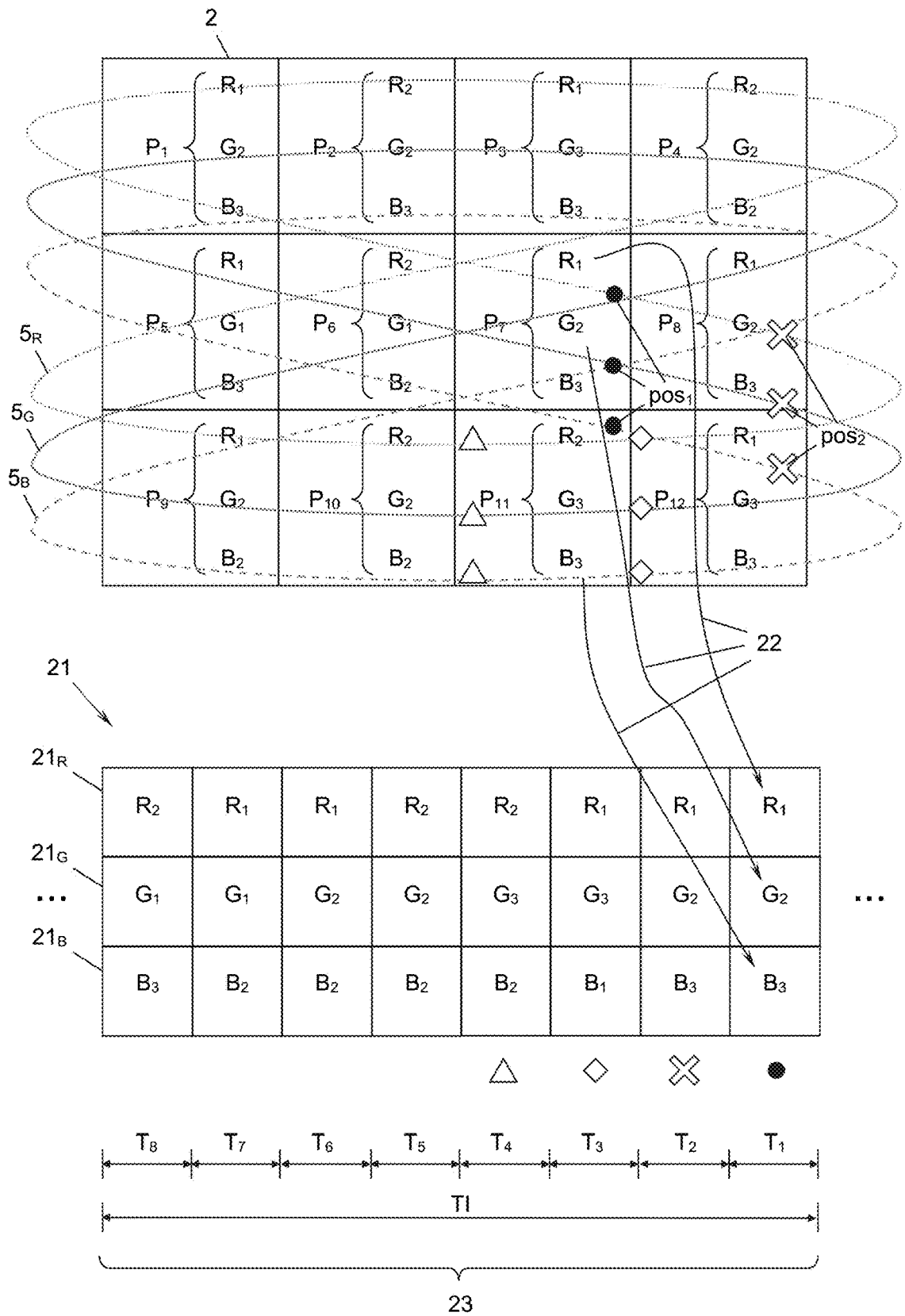
Figure 7:
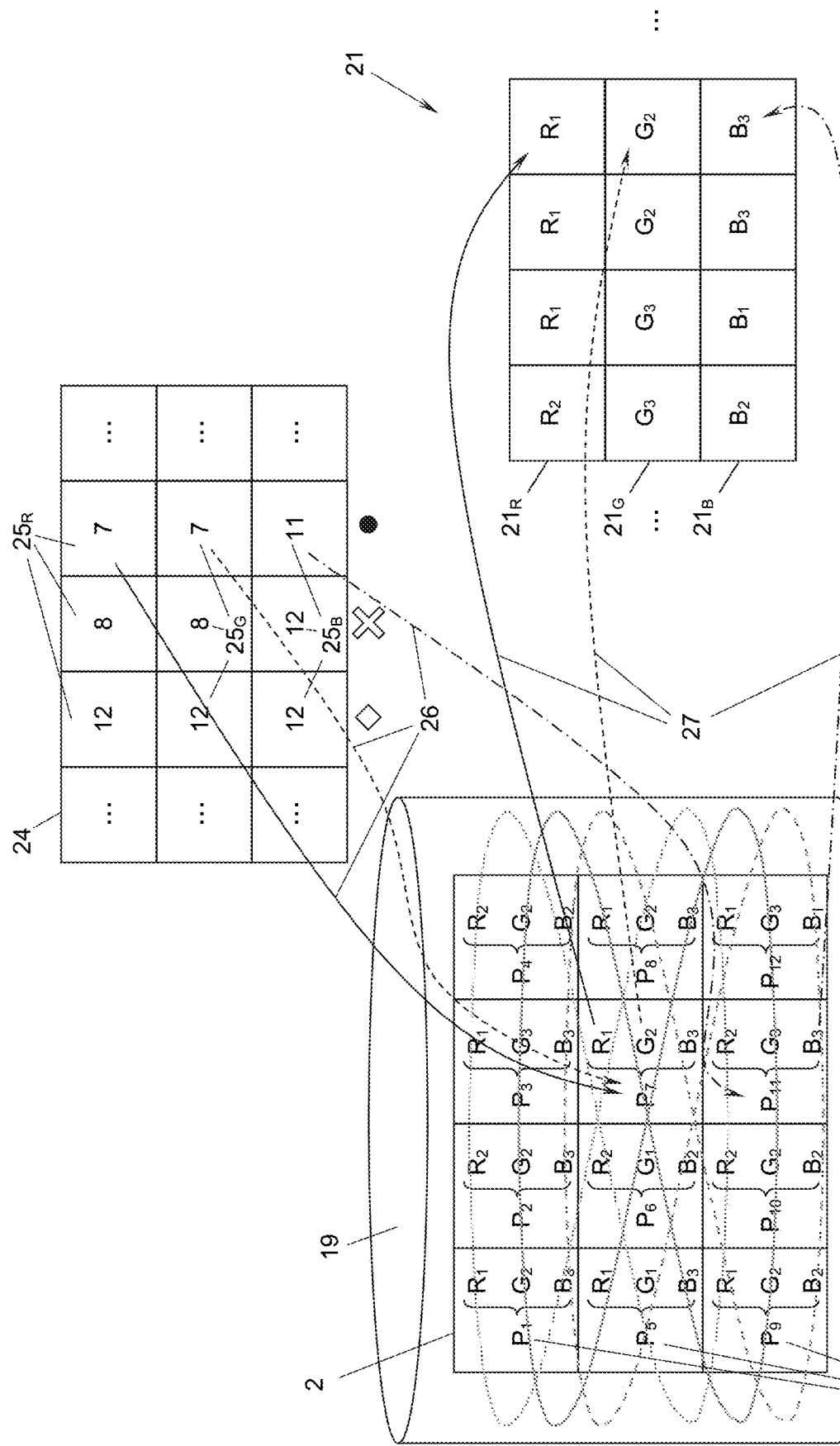
Figure 8:
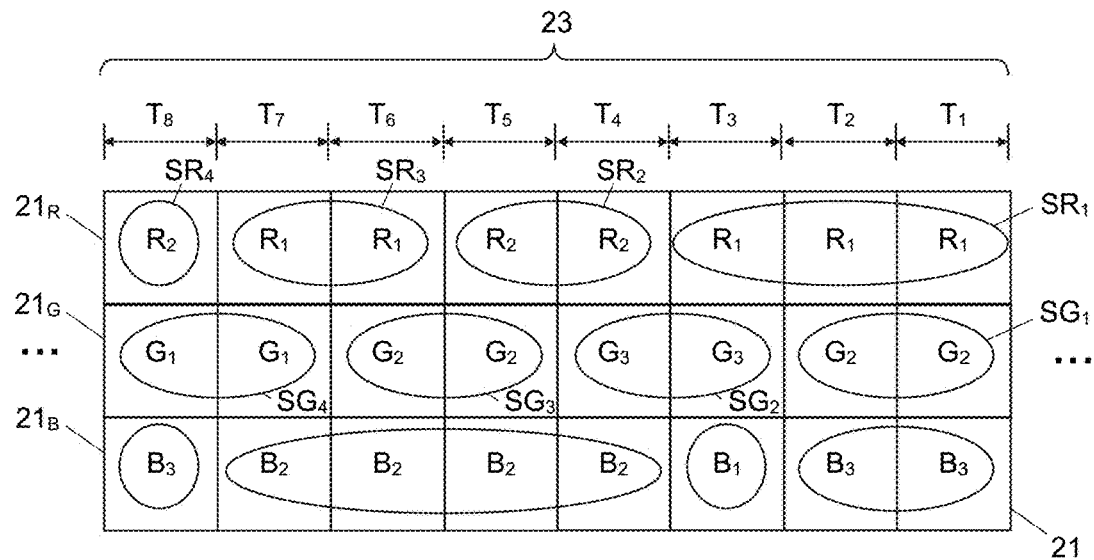
Figure 8:
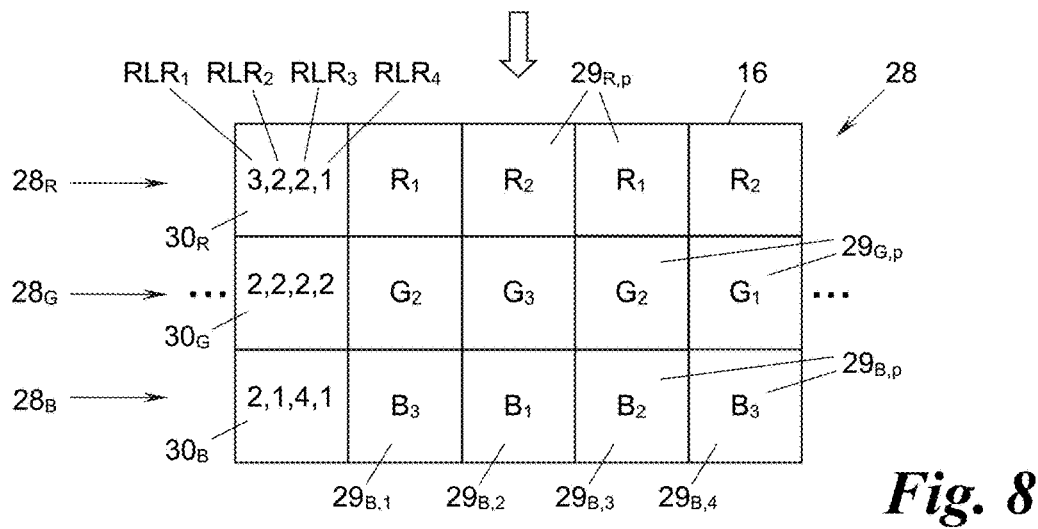
Figure 9:
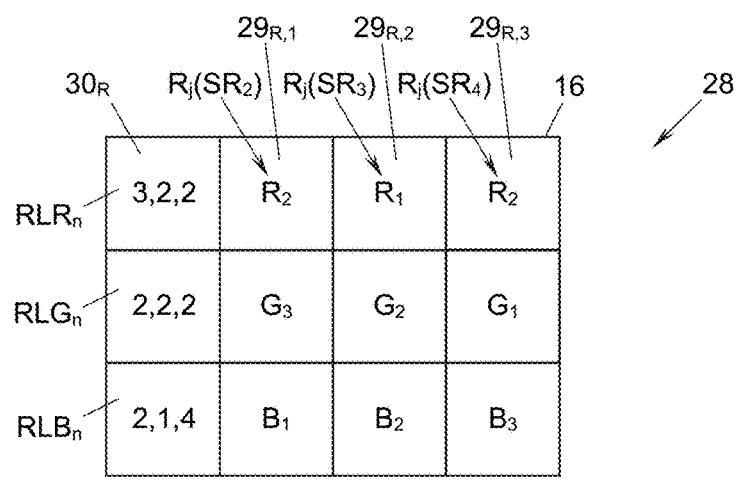
Figure 10:
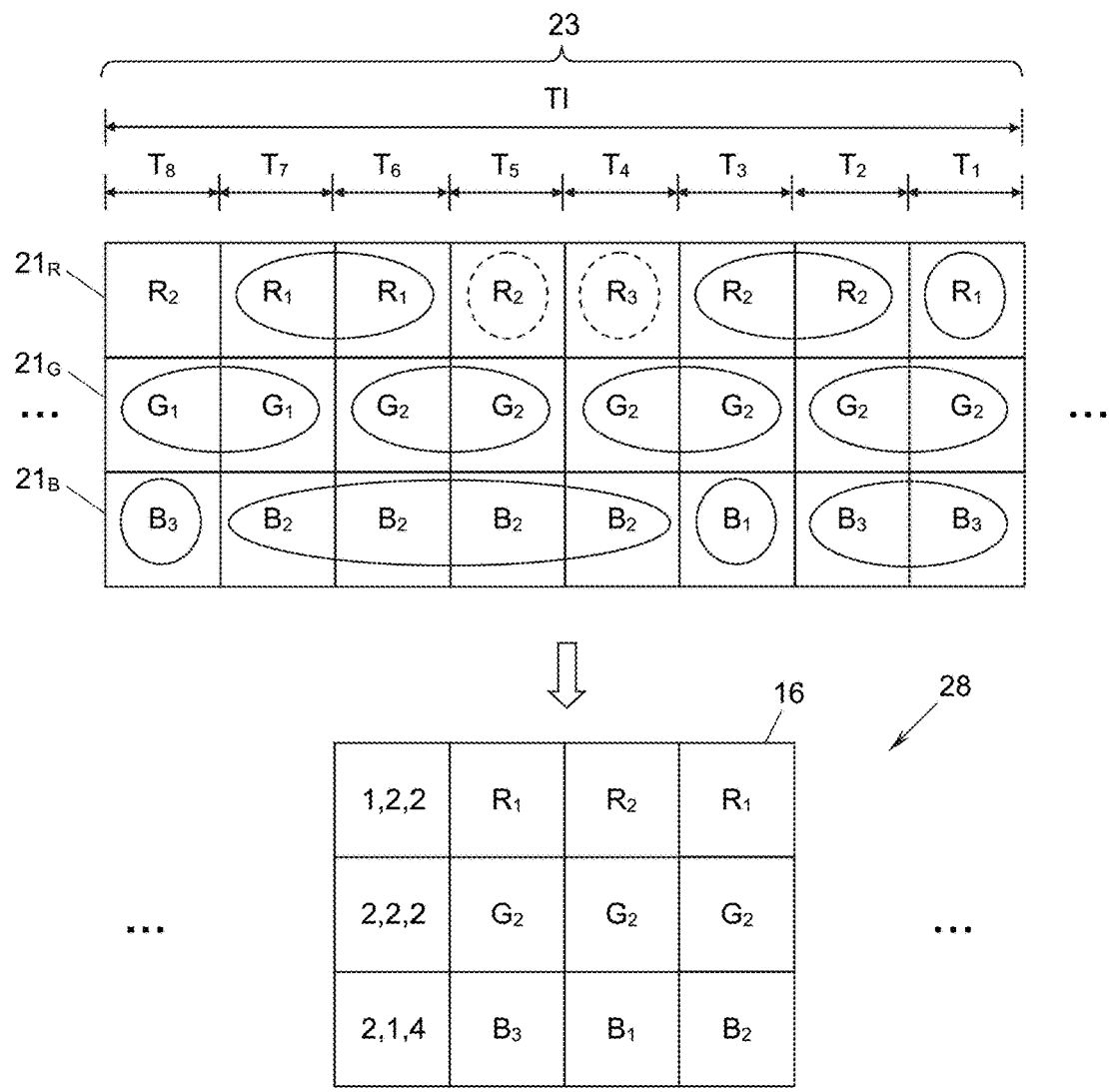
Figure 11:
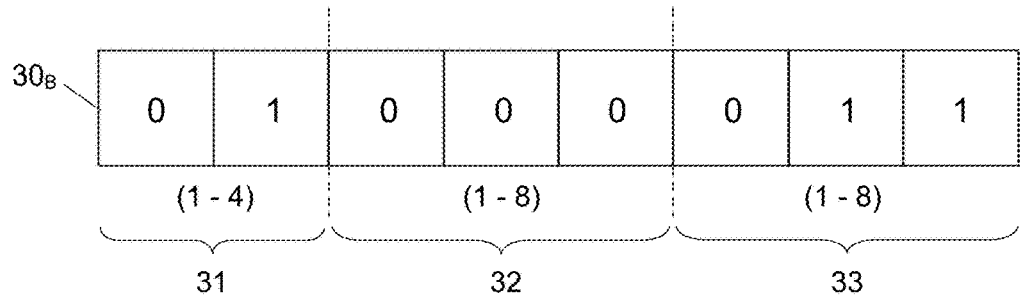

The disclosed subject matter will now be described by means of exemplary embodiments thereof with reference to the enclosed drawings, in which show:

FIG. 1 a projection system according to the disclosed subject matter, displaying colour values of pixels of an image on an image area, in a perspective view;

FIG. 2 a central processing unit, a buffer, and a projector with a light source, a light source driver and a scanner of the projection system of FIG. 1 in a schematic circuit diagram;

FIG. 3 the buffer, the light source driver, the light source and the scanner of FIG. 2 displaying an image by means of a bundled light beam comprised of coincident red, green and blue light beams in a schematic circuit diagram;

FIG. 4 the buffer, the light source driver, the light source and the scanner of FIG. 2 displaying an image by means of mutually displaced red, green and blue light beams in a schematic circuit diagram;

FIG. 5 a method of generating a compressed data stream from an image according to the present disclosed subject matter as performed by the projection system of FIG. 1 in a flow chart;

FIG. 6 an exemplary extracting of colour values from the image and appending the extracted colour values to an uncompressed data stream according to the method of FIG. 5 in a schematic diagram;

FIG. 7 the extraction of colour values by means of a look-up table as performed by the central processing unit of FIG. 2 in a schematic diagram;

FIG. 8 the steps of determining sets of colour values and their run-lengths in the uncompressed data stream of FIG. 6 and of generating a data packet of the compressed data stream according to the method of FIG. 5 in a schematic diagram;

FIG. 9 an exemplary alternative data packet as obtained by the steps of determining and generating of FIG. 8;

FIG. 10 the steps of determining sets of colour values and their run-lengths in a further exemplary uncompressed data stream and of generating a data packet of the compressed data stream according to the method of FIG. 5 in a schematic diagram; and FIG. 11 an eight bit run-length section of the data packet of FIG. 10 in a schematic diagram.

DETAILED DESCRIPTION

FIG. 1 shows a projection system 1 displaying an image 2 comprised of pixels $P_i$ onto a wall 3 by scanning the wall 3 with pulsed or continuous red, green and blue light beams $4_R$, $4_G$, $4_B$ (here: bundled in a bundled light beam $4_{RGB}$) according to a scan pattern 5 (here: a Lissajous pattern) to draw, one after the other, triplets of colour values $R_j$, $G_j$, $B_j$ of the pixels $P_i$ of the image 2. The image 2 may have a pixel resolution according to a conventional image or video standard, e.g., full HD (1920×1080 pixels), UHD (3840×2160 pixels), 4K (4096×2160 pixels) etc., and the Lissajous pattern 5 may densely cover the pixels $P_i$; however, for illustrational purposes an image 2 with only a few pixels $P_i$ and a simple, coarse Lissajous pattern 5 are shown in FIG. 1.

The image 2 is displayed for at least one time interval TI of successive time intervals and may be part of a movie 6 or be a single image, e.g., a photo to be displayed for a longer period of time. Instead of a wall 3, the projection system 1 could display the light beams $4_R$, $4_G$, $4_B$ onto any kind of image area, such as a board, projection screen, poster, the retina of an eye, an augmented reality (AR) combiner waveguide, another combiner optics, or the like. Accordingly, the projection system 1 may be part of a videobeamer, AR or VR (virtual reality) glasses, a helmet, a head-up display, etc.

With reference to FIGS. 1 to 4, the projection system 1 has a projector 7 with a light source 8, a light source driver 9 and a scanner 10. The light source 8 has a red, a green and a blue sub light source $8_R$, $8_G$, $8_B$ and emits the light beams $4_R$, $4_G$, $4_B$—either coincidentally as a bundled light beam $4_{RGB}$ as shown in FIGS. 1, 2 and 3 or mutually offset to one another as shown in FIG. 4—onto the scanner 10. To this end, the light source 8 and its sub light sources $8_R$, $8_G$, $8_B$ may be any light source known in the art, e.g., an incandescent lamp, a gas, liquid or solid laser, a laser diode, an LED, etc.

The scanner 10 scans the light beams $4_R$, $4_G$, $4_B$ across the wall 3 according to said scan pattern 5. The scanner 10 may be any scanner known in the art, e.g., comprising one or more movable deflectors or reflectors such as a scanning mirror, a scanning prism, a liquid lens, etc. In the embodiment shown, the scanner 10 is a mirror assembly which has one or more, here: one, micro-electro-mechanical-system, MEMS, mirror 11 deflecting the emitted light beams $4_R$, $4_G$, $4_B$ towards the wall 3.

The MEMS mirror 11 is driven by a mirror driver 12 of the scanner 10 to oscillate about a horizontal axis 13 with a horizontal oscillation period $T_h$ and about a vertical axis 14 with a vertical oscillation period $T_v$, in order to deflect the emitted light beams $4_R$, $4_G$, $4_B$ towards the wall 3 according to the Lissajous pattern 5. As the oscillation of the MEMS mirror 8, i.e. the movement of the scanner 10, determines the deflection pattern, i.e. the Lissajous pattern 5, both the oscillation and the deflection are carried out according to one and the same Lissajous pattern 5. Instead of a Lissajous pattern 5 any other scan pattern, e.g., a raster pattern, may be used.

Depending on the Lissajous pattern 5 to be displayed, $T_h$ and $T_v$ may be chosen such that the trajectories of the light beams $4_R$, $4_G$, $4_B$ on the wall 3 densely cover the entire image 2 during a period of one image frame. Such a "complex" or "dense" Lissajous pattern 5 can be achieved when the frequencies $f_h=1/T_h$, $f_v=1/T_v$ are greater than the frame rate $f_{fr}=1/T_{fr}$, e.g., greater than 1 kHz or tens of kHz, and the beginnings of their respective oscillation periods meet, e.g., only over every one or more image frames, in particular when the frequencies $f_h$, $f_v$ are close to each other. To this end, integer frequencies $f_h$, $f_v$ with a small greatest common divisor, e.g. smaller than 10, may be employed, for example.

The light source 8 is driven by the light source driver 9 which modulates each of the light beams $4_R$, $4_G$, $4_B$ in intensity according to red, green and blue colour values $R_j$, $B_j$, $G_j$ fed into the light source driver 9 to display the colour values $R_j$, $B_j$, $G_j$. To this end, the light source driver 9 may alter the power, the pulse width and/or the pulse rate of each light beam $4_R$, $4_G$, $4_B$. To synchronise the light source driver 9 and the mirror driver 12 the projection system 1 optionally has a buffer 15 which is connected to the light source driver 9 and the mirror driver 12.

The buffer 15 buffers the colour values $R_j$, $B_j$, $G_j$ in form of compressed data packets 16 that form a compressed data stream 17 which includes the colour values $R_j$, $B_j$, $G_j$ of the pixels $P_i$ of the image 2 in the correct order, i.e. in that order in which they are to be displayed. The buffer 15, e.g., by means of an internal buffer controller, feeds—synchronised by the mirror driver 12—the buffered colour values $R_j$, $B_j$, $G_j$ to the light source driver 9. In one embodiment the buffer 15 feeds the buffered colour values $R_j$, $G_j$, $B_j$ of one data packet 16 each time a synchronisation or trigger signal "trig" is received. In another embodiment the buffer 15 feeds the colour values $R_j$, $G_j$, $B_j$ successively according to an internal clock of the buffer 15, which internal clock may optionally be re-synchronised with the frequencies $f_h$, $f_v$ of the mirror driver 12 each time it receives the trigger signal trig.

To supply the buffer 15 with the colour values $R_j$, $B_j$, $G_j$ in said correct order the projection system 1 has a central processing unit (CPU) 18. The CPU 18 transforms the image 2, whose pixels $P_i$ and colour values $R_j$, $B_j$, $G_j$ are not ordered according to the Lissajous pattern 5, to the compressed data stream 17 whose colour values $R_j$, $B_j$, $G_j$ are ordered according to the Lissajous pattern 5. The CPU 18 then transfers the data packets 16 of the compressed data stream 17 to the buffer 15 for buffering. The CPU 18 holds the image 2 in a memory 19 which may be part of the CPU 18 or external therefrom.

With reference to FIGS. 2 and 5 to 11, a method 20 for generating one data packet 16 of the compressed data stream 17 will now be explained.

In a first part of the method 20 an uncompressed data stream 21 (FIG. 6) of red, green and blue colour values $R_j$, $B_j$, $G_j$ in the correct play-out order is produced (if not present before) or extended (if already present). To this end, for each sub-interval $T_1, T_2, \ldots, T_K$, generally $T_k$, of a fixed number K (in FIG. 6: K=8) of sub-intervals $T_k$ which together form said time interval TI, a step S1 of extracting the respective triplet of colour values $R_j$, $B_j$, $G_j$ for that sub-interval $T_k$ from the image 2 and a step S2 of appending the extracted triplet of colour values $R_j$, $B_j$, $G_j$ to the uncompressed data stream 21 are carried out in a loop LP1.

In step S1, that red colour value $R_j$ that is to be displayed by the red light beam $4_R$ within the respective sub-interval $T_k$, that green colour value $G_j$ that is to be displayed by the green light beam $4_G$ within the respective sub-interval $T_k$, and that blue colour value $B_j$ that is to be displayed by the blue light beam $4_B$ within the respective sub-interval $T_k$ are extracted from the image 2.

In the example of FIG. 6 for mutually offset light beams $4_R$, $4_G$, $4_G$ each being scanned according to a respective Lissajous pattern $5_R$ (dotted line), $5_G$ (solid line), $5_B$ (dashed line), in the first sub-interval $T_1$ the red, green and blue light beams $4_R$, $4_G$, $4_B$ traverse a respective first position $pos_1$ (denoted by dots) within the Lissajous patterns $5_R$, $5_G$, $5_B$. According to this position $pos_1$ within the Lissajous patterns $5_R$, $5_G$, $5_B$ the red, green and blue light beams $4_R$, $4_G$, $4_B$ are to display pixel $P_7$, pixel $P_7$ and pixel $P_{11}$, respectively, within the first sub-interval $T_1$. Hence, the red colour value $R_j$ of pixel $P_7$—which here has the value $R_1$—is extracted from the image 2, the green colour value $G_j$ of pixel $P_7$—which here has the value $G_2$—is extracted from the image 2, and the blue colour value $B_j$ of pixel $P_{11}$—which here has the value $B_3$—is extracted from the image 2. Similarly, for the second time interval $T_2$, the light beams $4_R$, $4_G$, $4_B$, traversing a respective second position $pos_2$ (denoted by crosses), are to display pixels $P_8$, $P_8$ and $P_{12}$, respectively, such that the colour values $R_1$, $G_2$ and $B_3$ are extracted from the image 2. The same procedure is applied for the other sub-intervals $T_k$, see diamonds and triangles denoting the pixels $P_i$ and colour values $R_j$, $B_j$, $G_j$ to be displayed within the third and fourth time intervals $T_3$, $T_4$. It shall be noted that due to varying velocities of the light beams $4_R$, $4_G$, $4_B$ within the Lissajous patterns $5_R$, $5_G$, $5_B$ the duration of stay of the light beams $4_R$, $4_G$, $4_B$ within the pixels $P_i$ is non-uniform such that the colour value $R_j$, $B_j$, $G_j$ of some pixels $P_i$ may be extracted repeatedly for several subsequent sub-intervals $T_k$.

In step S2, the extracted red, green and blue colour values $R_j$, $B_j$, $G_j$ are appended to the uncompressed data stream 21. As shown in FIG. 6, the uncompressed data stream 21 has a red sub-stream $21_R$ for the extracted red colour values $R_j$, a green sub-stream $21_G$ for the extracted green colour values $G_j$ and a blue sub-stream $21_B$ for the extracted blue colour values $B_j$. Thus, for the first time interval $T_1$, the extracted red colour value $R_1$ is appended to the red sub-stream $21_R$, the extracted green colour value $G_2$ is appended to the green sub-stream $21_G$, and the extracted blue colour value $B_3$ is appended to the blue sub-stream $21_B$, see arrows 22. Similarly, for the second (crosses), third (diamonds), fourth (triangle), . . . , to eight sub-intervals $T_1$-$T_8$ the extracted colour values $R_j$, $B_j$, $G_j$ are appended to the uncompressed data stream 21. The red, green and blue sub-streams $21_R$, $21_G$, $21_B$ of the uncompressed data stream 21 within the time interval TI thus form one segment 23 of the uncompressed data stream 21, which segment 23 is then packetized and compressed in the steps S3 and S4 of the method 20 to the data packet 16.

It shall be noted that the steps S1 and S2 may each be carried out in an alternating manner, i.e. for each sub-interval $T_k$ the colour values $R_j$, $B_j$, $G_j$ are extracted in step S1 and immediately appended in step S2, or in a successive manner, i.e. for all sub-intervals $T_k$ of the time interval $T_I$ first the colour values $R_j$, $B_j$, $G_j$ are extracted by carrying out step S1 for all sub-intervals $T_k$ and then all of the extracted colour values $R_j$, $B_j$, $G_j$ appended by carrying out step S2 for all sub-intervals $T_k$.

The CPU 18 may extract the respective colour values $R_j$, $B_j$, $G_j$ to be displayed by the respective light beam $4_R$, $4_G$, $4_B$ within each sub-interval $T_k$ by matching on-the-fly positions $pos_1$, $pos_2$, . . . that follow each other in time along the Lissajous pattern 5 to pixels $P_i$ and colour values $R_j$, $B_j$, $G_j$ in the image 2 occurring at these positions $pos_1$, $pos_2$, . . . .

FIG. 7 depicts an embodiment utilising a look-up table 24 for colour value extraction. Therein, the image 2 is stored in the memory 19 such that each pixel $P_i$ has a memory address 25 (in FIG. 7 coinciding with the index i of each pixel $P_i$). The Lissajous pattern 5 is stored in the look-up table 24, i.e. the look-up table 24 stores the memory addresses $25_R$, $25_G$, $25_B$ of the pixels $P_i$ as they are to be successively displayed, the ones for the dotted position $pos_1$ in the first visible column, the ones for the crossed position $pos_2$ in the second visible column, and so on and so forth. The CPU 18 successively reads the memory addresses $25_R$, $25_G$, $25_B$ from the look-up table 24 (e.g., the memory addresses 7, 7 and 11 for the dotted position $pos_1$) and retrieves the pixels $P_i$ from the memory 19 according to the read memory addresses $25_R$, $25_G$, $25_B$, see arrows 26. The CPU 18 may then extract the colour values $R_j$, $B_j$, $G_j$ from the retrieved pixels $P_7$, $P_7$ and $P_{11}$ and append them to the uncompressed data stream 21, see arrows 27.

Of course, the memory addresses 25 may be stored in the look-up table 24 in any other format than the one shown in FIG. 7, as long as they provide an indication of the pixels $P_i$ to be displayed in the correct play-out order.

In the subsequent steps S3 and S4 of the method 20, the segment 23 of the uncompressed data stream 21 is subjected to a specific run-length encoding to compress and packetize the uncompressed data stream 21.

In step S3, N sets $SR_n$, $SG_n$, $SB_n$ of colour values $R_j$, $B_j$, $G_j$ and their respective run-lengths $RLR_n$, $RLG_n$, $RLB_n$ are determined for each sub-stream $21_R$, $21_G$, $21_B$ of the segment 23. As shown in FIG. 8 the CPU 18 determines in the red sub-stream $21_R$ of the segment 23 N sets $SR_1$, $SR_2$, ..., $SR_N$, generally $SR_n$, (here: N=4) of one or more successive equal red colour values $R_j$ and their respective run-lengths $RLR_1$, $RLR_2$, ..., $RLR_N$, generally $RLR_n$, indicating the number of red colour values $R_j$ in the respective set $SR_n$. In the example of FIG. 8, the CPU 18 determines four red sets $SR_n$, from right to left: a first set $SR_1$ of three successive equal colour values $R_1$, a second set $SR_2$ of two successive equal colour values $R_2$, a third set $SR_3$ of two successive equal colour values $R_1$ and a fourth set $SR_4$ of one colour value $R_2$. Hence, the run-lengths $RLR_n$ of the sets $SR_n$ are determined as 3, 2, 2 and 1, respectively. Similarly, in the green sub-stream $21_G$ of the segment 23 N sets $SG_1$, $SG_2$, ..., $SG_N$, generally $SG_n$, of one or more successive equal green colour values $G_j$ and their respective run-lengths $RLG_1$, $RLG_2$, ..., $RLG_N$, generally $RLG_n$, are determined. Likewise, in the blue sub-stream $21_B$ of the segment 23 N sets $SB_1$, $SB_2$, ..., $SB_N$, generally $SB_n$, of one or more successive equal blue colour values $B_j$ and their respective run-lengths $RLB_1$, $RLB_2$, ..., $RLB_N$, generally $RLB_n$, are determined.

The determined sets $SR_n$, $SG_n$, $SB_n$ and run-lengths $RLR_n$, $RLG_n$, $RLB_n$ are then used in step S4 to generate one data packet 16 of the compressed data stream 17 for the segment 23. The data packet 16 includes one red colour value $R_j$ from each of at least N−1 of the red sets $SR_n$ determined in step S3, in the example of FIG. 8—now from left to right—of one colour value $R_1$ from the first red set $SR_1$, one colour value $R_2$ from the second red set $SR_2$, one colour value $R_1$ from the third red set $SR_3$ and one colour value $R_2$ from the fourth red set $SR_4$. The data packet 16 further includes one green colour value $G_j$ from each of at least N−1 of the green sets $SG_n$ determined in step S3, in the example of FIG. 8—from left to right—of one colour value $G_2$ from the first green set $SG_1$, one colour value $G_3$ from the second green set $SG_2$, one colour value $G_2$ from the third green set $SG_3$ and one colour value $G_1$ from the fourth green set $SG_4$. The data packet 16 also includes one blue colour value $B_j$ from each of at least N−1 of the blue sets $SB_n$ determined in step S3, in the example of FIG. 8—from left to right—of one colour value $B_3$ from the first blue set $SB_1$, one colour value $B_1$ from the second blue set $SB_2$, one colour value $B_2$ from the third blue set $SB_2$ and one colour value $B_3$ from the fourth blue set $SB_4$.

In addition the data packet 16 includes the run-lengths $RLR_n$ of at least N−1 of the red sets $SR_n$ determined in step S3 (here: the run-lengths 3, 2, 2, 1 for the first to fourth red set $SR_1$—$SR_4$), the run-lengths $RLG_n$ of at least N−1 of the green sets $SG_n$ determined in step S3 (here: the run-lengths 2, 2, 2, 2 for the green sets $SG_1$-$SG_4$), and the run-lengths $RLB_n$ of at least N−1 of the blue sets $SB_n$ determined in step S3 (the run-lengths 2, 1, 4, 1 for the blue set $SB_1$-$SB_4$).

The so generated data packet 16 thus encodes the segment 23 of the uncompressed stream 21 in a compressed form (compare the required eight sub-interval slots of the segment 23 with the required five slots of the data packet 16) and forms a part (or the whole if there is only one data packet 16 therein) of the compressed data stream 17. Optionally—in an "online" or "on-the-fly" embodiment—the generated data packet 16 is fed towards the light source driver 12 in a step S5 either directly (in embodiments without the buffer 15) or via the buffer 15. Any of the light source driver 12 or the buffer 15 may then decompress (decode) the data packet 16, if necessary, or process the data packet 16 as is. In a further optional step S6 of the method 20, the data packet 16, i.e. the colour values $R_j$, $B_j$, $G_j$ included therein, may be displayed by the projector 7 for the respective run-lengths $RLR_n$, $RLG_n$, $RLB_n$.

As shown in FIG. 5, to generate one or more further data packets 16 of the data stream 17, the steps of extracting (step S1), appending (step S2), determining (step S3) and of generating (step S4) may be repeated in a loop LP2 for one or more further time intervals TI, optionally with the steps of feeding (step S5) and displaying (step S6) to display a compressed data stream 17 having more than one data packet 16.

The CPU 18 may feed one data packet 16 when it is triggered by the mirror driver 9 as indicated by the dashed line A in FIG. 2, or when the buffer 15 indicates a low filling level as indicated by the chain-dotted line B in FIG. 2, or each time a predetermined time interval has lapsed, e.g., every n-th cycle of the clock of the CPU 18, or the like.

As shown in the example of FIG. 8, the number of red colour values $R_j$, the number of green colour values $G_j$ and the number of blue colour values $B_j$ included in the data packet 16 may each be equal to the number N of determined sets (here: four). Moreover, the number of red colour values $B_j$, the number of green colour values $G_j$ and the number of blue colour values $B_j$ may be the same for all colours red, green and blue, e.g., be N (here: four) or N−1 (here: three, see FIG. 9). Hence, the data packet 16 is uniform. Alternatively, the number of red, green and blue colour values $R_j$, $B_j$, $G_j$ included in the data packet 16 may differ.

With reference to FIGS. 9 and 10, two-optionally combinable-embodiments for a generation of a size-reduced data packet 16 in step S4 shall be described.

In the first of the two packet size-reducing embodiments, the first colour values $R_j$, $G_j$, $B_j$ of the segment 23 (here: the colour values $R_1$, $G_2$ and $B_3$ on the right of FIG. 8) are assumed to correspond to the last colour values $R_j$, $G_j$, $B_j$ of a previous data packet 16, and, hence, are not included in the size-reduced data packet 16 of FIG. 9. To this end, one of the N red sets $SR_n$ is determined as the "first" set of one or more successive equal red colour values $R_j$ in the red sub-stream $21_R$ of the segment 23, i.e., the temporally first set comprising the first red colour value $R_j$ occurring in the segment 23 ($R_1$ in FIG. 8) is determined as one of the N determined red sets $SR_n$. Similarly, one of the N green sets $SG_n$ is determined as the first set of one or more successive equal green colour values $G_j$ in the green sub-stream $21_G$ of the segment 23; and one of the N blue sets $SB_n$ is determined as the first set of one or more successive equal blue colour values $B_j$ in the blue sub-stream $21_B$ of the segment 23. The colour values $R_j$, $G_j$, $B_j$ ($R_1$, $G_2$ and $B_3$ on the right of FIG. 8) of these first sets $SR_1$, $SG_1$, $SB_1$ are not included in the data packet 16 (they are assumed to correspond to the last colour values $R_j$, $G_j$, $B_j$ of the preceding data packet 16), whereas, however, the run-lengths $RLR_1$, $RLG_1$, $RLB_1$ of these first sets $SR_1$, $SG_1$ and $SB_1$ will still be included in the data packet 16 (not shown).

In the second of the two packet size reducing embodiments, shown in FIG. 9, the run-lengths $RLR_N$, $RLG_N$, $RLB_N$ of those sets $SR_N$, $SG_N$, $SB_N$ which are to be displayed latest are not included in the data packet 16, see the omission of the run-lengths $RLR_4$, $RLG_4$, $RLB_4$ of FIG. 8 in the data packet 16 of FIG. 9. In other words, only the run-lengths $RLR_n$, $RLG_n$, $RLB_n$ of that N−1 red, N−1 green and N−1 blue sets $SR_n$, $SG_n$, $SB_n$ which are to be displayed earliest in the segment 23 are included in the data packet 16. The omitted run-lengths $RLR_N$, $RLG_N$, $RLB_N$ may be calculated later on as the difference between the number K of sub-intervals $T_k$ (here: 8) and the run-lengths included in the data packet 16. For instance, the run-length $RLR_4$ of the last red set $SR_4$ may be determined as 8−(3+2+2)=1, the run-length $RLG_4$ of the last green set $SG_4$ may be determined as 8−(2+2+2)=2, and the run-length $RLB_4$ of the last blue set $SB_4$ may be determined as 8−(2+1+4)=1, without including these run-lengths $RLR_4$, $RLG_4$, $RLB_4$ in the data packet 16.

The colour values $R_j$, $G_j$, $B_j$ and run-lengths $RLR_n$, $RLG_n$, $RLB_n$ included in the data packet 16 may be arranged in many ways when generating the data packet 16, e.g., as a list, in particular a list of doublets each of a colour value $R_j$, $G_j$, $B_j$ and the respective run-length $RLR_n$, $RLG_n$, $RLB_n$.

In the embodiments shown in FIGS. 8 to 10, the data packet 16 is generated in form of a matrix 28 with one line $28_R$ ("red line"), $28_G$ ("green line"), $28_B$ ("blue line") per colour. Each line $28_R$, $28_G$, $28_B$ (here: a row; alternatively: a column) has respective red, green or blue colour value sections $29_{R,1}$, $29_{R,2}$, . . . , generally $29_{R,p}$; $29_{G,1}$, $29_{G,2}$, . . . , generally $29_{G,p}$; $29_{B,1}$, $29_{B,2}$, . . . , generally $29_{B,p}$, each containing a respective one of the colour values $R_j$, $G_j$, $B_j$ included in the data packet 16. In addition, each line $28_R$, $28_G$, $28_B$ has a run-length section $30_R$, $30_G$, $30_B$ containing the run-lengths $RLR_n$, $RLG_n$, $RLB_n$ included in the data packet 16. Thereby, all the run-length sections $30_R$, $30_G$, $30_B$ are arranged in one and the same column of the matrix 28 for eased processing of the data packet 16. While the run-length sections $30_R$, $30_G$, $30_B$ are arranged in the first column of the matrix 28 of FIGS. 8 to 10, alternatively, they may be arranged in any other column (not shown).

When the data packet 16 is generated in form of the matrix 28, the run-length sections $30_R$, 30G. $30_B$ and the colour value sections $29_{R,p}$, $29_{G,p}$, $29_{B,p}$ may optionally have the same number of bits, i.e. the same size of, e.g., six, eight (FIG. 11), ten, twelve or sixteen bits. Then, each column of the matrix 28 has the same size such that the data packet 16 "looks" like a part of a standard video stream such as a DSI or HDMI stream.

FIG. 11 depicts an exemplary run-length section $30_B$ of the data packet 16 shown in FIG. 10 generated using the first packet size reduced embodiment as mentioned above for four determined sets $SR_n$, $SG_n$, $SB_n$ of each colour (N=4). The run-length section $30_B$ has a size of eight bits (each bit depicted by a box). A first field 31 of two bits indicates the run-length $RLB_1$ (here: 2) of the first blue set $SB_1$ (the first one in the segment 23 comprising the first colour value $B_3$). The two bits may be used to indicate run-lengths $RLB_1$ between 1 and 4 sub-intervals TR. A second field 32 of three bits indicates the run-length $RLB_2$ (here: 1) of the second blue set $SB_2$, and a third field 33 of three bits indicates the run-length $RLB_3$ (here 4) of the third blue set $SB_3$. The three bits of the second and third fields may indicate the run-lengths $RLB_2$ and $RLB_3$, respectively, between 1 and 8 sub-intervals $T_k$.

The compression of the uncompressed data stream 21 according to the method 20 may—depending on the colour value statistics of the image 2 and the scan pattern 5—require the omission of colour values $R_j$, $G_j$, $B_j$ of the segment 23 or a partitioning of colour values $R_j$, $G_j$, $B_j$ with a long run-length $RLR_n$, $RLG_n$, $RLB_n$ into several sets $SR_n$, $SG_n$, $SB_n$ in step S3. This shall be exemplified with reference to FIG. 10.

FIG. 10 shows a segment 23 obtained for an image 2 or time interval TI with a red sub-stream $21_R$ that has more than four sets of one or more successive equal colour values $R_j$, which, hence, cannot be all represented in the compressed data packet 16 of the above examples. In order to lose as little information as possible by the compression steps S3 and S4, N−1 (here: three) of the red sets $SR_n$ are determined as those sets that have the highest run-lengths among all possible sets of one or more successive equal red colour values $R_j$ in the red sub-stream $21_R$ of the segment 23. For instance, instead of using the dotted sets in FIG. 10 which have only a single colour value, the following set of two successive equal colour values $R_1$ is used.

If desired, all of the N red sets $SR_n$ may be determined as those that have the highest run-lengths $RLR_n$ (not shown). Alternatively, e.g., in combination with the above-mentioned first packet size-reducing embodiment, the first red colour value $R_j$ in the segment 23 may always be included as the first set $SR_1$, no matter what its corresponding run-length $RLR_1$ is, as shown in FIG. 10.

Of course, the described run-length maximization may be carried out for all of the colours red, green and blue in the step S3 of determining the N sets.

The green sub-stream $21_G$ of FIG. 10 only has two different green colour values $G_1$ and $G_2$. Hence, when determining the four sets $SG_n$ therefrom, some successively equal green colour values $G_2$ have to be included in different sets $SG_n$, as indicated by the three sets $SG_1$-$SG_3$ each containing two equal colour values $G_2$.

The number N of determined sets, the (bit) size of the run-length sections $30_R$, $30_G$, $30_B$ and the number K of sub-intervals may be chosen in many ways, e.g., in dependence of one another and/or of a colour value statistics of the image/s 2 to be displayed. To allow for long run-lengths $RLR_n$, $RLG_n$, $RLB_n$ within the segment 23, the number K of sub-intervals $T_k$ per time interval TI may optionally be at least six or at least eight.

In general, the steps S1-S6 of the method 20 may be carried out in any order as far as one step does not depend on the result of another step.

It shall be noted that the method 20 described herein may be carried out on-the-fly, i.e., the generated data packet/s 16 are immediately fed into the projector 7, or offline, i.e., the generated data packet/s 16 are stored for a feeding later on.

The disclosed subject matter is not restricted to the specific embodiments described above but encompasses all variants, modifications and combinations thereof that fall within the scope of the appended claims.

What is claimed is:

1. A method of generating a compressed data stream from an image comprised of pixels which each have a red, a green and a blue colour value, wherein the compressed data stream is to be fed into a projector scanning a red, a green and a blue light beam across an image area according to a given scan pattern, the light beams being modulated in intensity according to respective red, green and blue colour values in the compressed data stream, the method comprising, for each sub-interval of a fixed number of sub-intervals which together form a time interval:
extracting, from the image, i) that red colour value that is to be displayed by the red light beam within said sub-interval according to the scan pattern, ii) that green colour value that is to be displayed by the green light beam within said sub-interval according to the scan pattern, and iii) that blue colour value that is to be displayed by the blue light beam within said sub-interval according to the scan pattern, and
appending the extracted red, green and blue colour values to an uncompressed data stream which has a red sub-stream for the extracted red colour values, a green sub-stream for the extracted green colour values and a blue sub-stream for the extracted blue colour values, wherein the red, green and blue sub-streams within said time interval form one segment of the uncompressed data stream;

determining, i) in the red sub-stream of said segment, N red sets each of one or more successive equal red colour values and for each red set a run-length indicating a number of red colour values in this red set, ii) in the green sub-stream of said segment, N green sets each of one or more successive equal green colour values and for each green set a run-length indicating a number of green colour values in this green set, and iii) in the blue sub-stream of said segment, N blue sets each of one or more successive equal blue colour values and for each blue set a run-length indicating a number of blue colour values in this blue set, wherein at least one of said sets comprises at least two successive equal colour values;

generating, for said segment, a data packet composed of one red colour value from each of at least N−1 red sets, one green colour value from each of at least N−1 green sets, one blue colour value from each of at least N−1 blue sets, the run-lengths of at least N−1 red sets, the run-lengths of at least N−1 green sets, and the run-lengths of at least N−1 blue sets, which data packet forms the compressed data stream for said time interval.

2. The method according to claim 1, wherein i) at least all but one of the N red sets are determined as those sets that have the highest run-lengths among all possible sets of one or more successive equal red colour values in the red sub-stream of the segment, ii) at least all but one of the N green sets are determined as those sets that have the highest run-lengths among all possible sets of one or more successive equal green colour values in the green sub-stream of the segment, and iii) at least all but one of the N blue sets are determined as those sets that have the highest run-lengths among all possible sets of one or more successive equal blue colour values in the blue sub-stream of the segment.

3. The method according to claim 1, wherein i) one of the N red sets is determined as the first set of one or more successive equal red colour values in the red sub-stream of the segment, ii) one of the N green sets is determined as the first set of one or more successive equal green colour values in the green sub-stream of the segment, and iii) one of the N blue sets is determined as the first set of one or more successive equal blue colour values in the blue sub-stream of the segment, and wherein the run-lengths of the first sets are included in the data packet, whereas the colour values of the first sets are not included in the data packet.

4. The method according to claim 1, wherein i) only the run-lengths of that N−1 red sets which are to be displayed earliest in the segment are included in the data packet, ii) only the run-lengths of that N−1 green sets which are to be displayed earliest in the segment are included in the data packet, and iii) only the run-lengths of that N−1 blue sets which are to be displayed earliest in the segment are included in the data packet.

5. The method according to claim 1, wherein the data packet is generated as a matrix with i) a red line having red colour value sections each containing one of the red colour values included in the data packet and a red run-length section containing the run lengths of the red sets included in the data packet, ii) a green line having green colour value sections each containing one of the green colour values included in the data packet and a green run-length section containing the run lengths of the green sets included in the data packet, and iii) a blue line having blue colour value sections each containing one of the blue colour values included in the data packet and a blue run-length section containing the run lengths of the blue sets included in the data packet, wherein all the run-length sections form one row or column of the matrix.

6. The method according to claim 5, wherein i) only the run-lengths of that N−1 red sets which are to be displayed earliest in the segment are included in the data packet, ii) only the run-lengths of that N−1 green sets which are to be displayed earliest in the segment are included in the data packet, and iii) only the run-lengths of that N−1 blue sets which are to be displayed earliest in the segment are included in the data packet, and wherein N is four and each run-length section has a size of eight bits, the first two bits indicating the run-length of the respective first set, the next three bits indicating the run-length of the respective second set, and the last three bits indicating the run-length of the respective third set.

7. The method according to claim 5, wherein each of the run-length and colour value sections has one and the same number of bits.

8. The method according to claim 1, wherein said fixed number of sub-intervals is at least six.

9. The method according to claim 1, wherein said scan pattern is a Lissajous pattern.

10. The method according to claim 1, wherein the image is stored in a memory, each pixel having a memory address, the scan pattern is stored in a form of a look-up table of memory addresses of the pixels to be successively displayed, and wherein the colour values are extracted from the image by retrieving the pixels from the memory according to the memory addresses read successively from the look-up table and extracting the respective colour values from the retrieved pixels.

11. The method according to claim 1, wherein said steps of extracting, appending, determining and generating are repeated for at least one further time interval to generate at least one further data packet, the data packets forming the compressed data stream.

12. A projection system for displaying pixels of an image, comprising a projector with a light source configured to emit a red, a green and a blue light beam, a light source driver configured to modulate the light beams in intensity according to red, green and blue colour values in a compressed data stream, a scanner configured to scan the light beams across an image area according to a given scan pattern; and a central processing unit, CPU, configured to hold the image in a memory, for each sub-interval of a fixed number of sub-intervals which together form a time interval:

extract, from the image, i) that red colour value that is to be displayed by the red light beam within said sub-interval according to the scan pattern, ii) that green colour value that is to be displayed by the green light beam within said sub-interval according to the scan pattern, and iii) that blue colour value that is to be displayed by the blue light beam within said sub-interval according to the scan pattern, and append the extracted red, green and blue colour values to an uncompressed data stream which has a red sub-stream for the extracted red colour values, a green sub-stream for the extracted green colour values and a blue sub-stream for the extracted blue colour values, wherein the red, green and blue sub-streams within said time interval form one segment of the uncompressed data stream;

determine, i) in the red sub-stream of said segment, N red sets each of one or more successive equal red colour values and for each red set a run-length indicating a number of red colour values in this red set, ii) in the green sub-stream of said segment, N green sets each of one or more successive equal green colour values and for each green set a run-length indicating a number of green colour values in this green set and iii) in the blue sub-stream of said segment, N blue sets each of one or more successive equal blue colour values and for each blue set a run-length indicating a number of blue colour values in this blue set, wherein at least one of said sets comprises at least two successive equal colour values;

generate, for said segment, a data packet composed of one red colour value from each of at least N−1 red sets, one green colour value from each of at least N−1 green sets, one blue colour value from each of at least N−1 blue sets, the run-lengths of at least N−1 red sets, the run-lengths of at least N−1 green sets, and the run-lengths of at least N−1 blue sets, which data packet forms the compressed data stream for said time interval; and feed the compressed data stream towards the projector for displaying.

13. The projection system according to claim 12, further comprising a buffer interposed between the CPU and the projector.

14. The projection system according to claim 13, wherein the buffer is configured to feed the data packet in synchronism with the scanner to the projector for displaying.

15. The projection system according to claim 12, wherein said scan pattern is a Lissajous pattern.

16. The method according to claim 7, wherein the number of bits is six, eight, ten, twelve or sixteen.

17. The method according to claim 8, wherein said fixed number of sub-intervals is at least eight.

* * * * *